US010252724B2

(12) United States Patent
Edney (10) Patent No.: US 10,252,724 B2
(45) Date of Patent: Apr. 9, 2019

(54) PORTABLE TWO-WHEELED SELF-BALANCING PERSONAL TRANSPORT VEHICLE (71) Applicant: P&N PHC, LLC, Newport Beach, CA (US)

(72) Inventor: Daniel Bryan Laird Edney, Irvine, CA (US)

(73) Assignee: P&N PHC, LLC, Newport Beach, CA (US)

(*) Notice: Subject to any disclaimer, the term of this patent is extended or adjusted under 35 U.S.C. 154(b) by 451 days.

(21) Appl. No.: 15/092,460

(22) Filed: Apr. 6, 2016

(65) Prior Publication Data

US 2017/0088212 A1 Mar. 30, 2017

Related U.S. Application Data (60) Provisional application No. 62/222,779, filed on Sep. 24, 2015.

(51) Int. Cl.
B60W 40/13 (2012.01)
B62K 11/00 (2006.01)
B62K 23/08 (2006.01)

(52) U.S. Cl.
CPC ........... B60W 40/13 (2013.01); B62K 11/007 (2016.11); B62K 23/08 (2013.01); Y02T 10/7258 (2013.01)

(58) Field of Classification Search
CPC .. B62K 11/007; B62K 23/08; B62J 2099/002; B60W 40/13; B60W 40/11; B62D 51/02; B62D 51/001

(Continued)

(56) References Cited

U.S. PATENT DOCUMENTS 3,399,742 A 9/1968 Malick
4,624,469 A 11/1986 Bourne, Jr.
(Continued)

FOREIGN PATENT DOCUMENTS

CN 100431906 C 11/2008
CN 101353070 A 1/2009
(Continued)

OTHER PUBLICATIONS

Sasaki, Makiko et al., Steering Control of the Personal Riding-type Wheeled Mobile Platform (PMP), IEEE/RSJ International Conference on Intelligent Robots and Systems, Aug. 2005, pp. ii-lii and 3821-2826, vol. 4.
(Continued)

Primary Examiner — Anne Marie M Boehler
(74) Attorney, Agent, or Firm — Mauriel Kapouytian Woods LLP; Elaine K. Lee (57) ABSTRACT A portable two-wheeled self-balancing personal transport vehicle comprises a single support platform having first and second foot placement sections, one or more inertial sensors operable to provide pitch data for the platform. The first foot placement section and the second foot placement section are associated with a first wheel and a second wheel respectively controlled by a first and a second drive motor. At least one load sensor provides first load data for the first foot placement section and at least one load sensor provides second load data for the second foot placement section. Control circuitry is connected to the first and second drive motors, and operable to transmit to the first and second drive motors balancing signals for self-balancing the support platform housing in response to the pitch data, as well as one or more steering torque signals in response to the first and second load data.

15 Claims, 4 Drawing Sheets (58) Field of Classification Search
USPC ................ 180/180, 181, 218; 280/304.5
See application file for complete search history.

(56) References Cited

U.S. PATENT DOCUMENTS

| | | | |
|---|---|---|---|
| 5,236,058 A | 8/1993 | Yamet et al. | |
| 5,376,868 A | 12/1994 | Toyoda et al. | |
| 5,701,965 A | 12/1997 | Kamen et al. | |
| 5,791,425 A | 8/1998 | Kamen et al. | |
| 5,794,730 A | 8/1998 | Kamen | |
| 5,864,285 A | 1/1999 | Wieder et al. | |
| 5,971,091 A | 10/1999 | Kamen et al. | |
| 5,973,463 A | 10/1999 | Okuda et al. | |
| 5,986,221 A | 11/1999 | Stanley | |
| 6,050,357 A * | 4/2000 | Staelin | A63C 17/004 180/65.1 |
| 6,059,062 A | 5/2000 | Staelin et al. | |
| 6,223,104 B1 | 4/2001 | Kamen et al. | |
| 6,225,977 B1 | 5/2001 | Li | |
| 6,288,505 B1 | 9/2001 | Heinzmann et al. | |
| 6,302,230 B1 | 10/2001 | Kamen et al. | |
| 6,332,103 B1 | 12/2001 | Steensen, Jr. et al. | |
| 6,367,817 B1 | 4/2002 | Kamen et al. | |
| 6,538,411 B1 | 3/2003 | Field et al. | |
| 6,561,294 B1 | 5/2003 | Kamen et al. | |
| 6,571,892 B2 | 6/2003 | Kamen et al. | |
| 6,581,714 B1 | 6/2003 | Kamen et al. | |
| 6,651,763 B1 | 11/2003 | Kamen et al. | |
| D493,128 S | 7/2004 | Waters et al. | |
| 6,789,640 B1 | 9/2004 | Arling et al. | |
| 6,868,931 B2 | 3/2005 | Morrell et al. | |
| 6,907,949 B1 | 6/2005 | Wang | |
| 6,920,947 B2 | 7/2005 | Kamen et al. | |
| 7,023,330 B2 | 4/2006 | Kamen et al. | |
| 7,083,178 B2 | 8/2006 | Potter | |
| 7,090,040 B2 | 8/2006 | Kamen et al. | |
| D528,468 S | 9/2006 | Arling et al. | |
| 7,195,259 B2 | 3/2007 | Gang | |
| 7,275,607 B2 | 10/2007 | Kamen et al. | |
| 7,338,056 B2 | 3/2008 | Chen et al. | |
| 7,363,993 B2 | 4/2008 | Ishii | |
| 7,367,572 B2 | 5/2008 | Jiang | |
| 7,467,681 B2 | 12/2008 | Hiramatsu | |
| 7,479,872 B2 | 1/2009 | Kamen et al. | |
| 7,481,291 B2 | 1/2009 | Nishiwaka | |
| D601,922 S | 10/2009 | Imai et al. | |
| 7,740,099 B2 | 6/2010 | Field et al. | |
| 7,775,534 B2 | 8/2010 | Chen et al. | |
| 7,783,392 B2 | 8/2010 | Oikawa | |
| 7,857,088 B2 | 12/2010 | Field et al. | |
| 7,958,956 B2 | 6/2011 | Kakinuma et al. | |
| 8,014,923 B2 | 9/2011 | Ishii et al. | |
| 8,028,777 B2 | 10/2011 | Kakinuma et al. | |
| 8,047,556 B2 | 11/2011 | Jang et al. | |
| 8,113,524 B2 | 2/2012 | Karpman | |
| 8,157,274 B2 | 4/2012 | Chen | |
| 8,170,780 B2 | 5/2012 | Field et al. | |
| 8,225,891 B2 | 7/2012 | Takenaka et al. | |
| 8,248,222 B2 | 8/2012 | Kamen et al. | |
| 8,408,565 B2 | 4/2013 | An | |
| 8,459,668 B2 | 6/2013 | Yoon | |
| 8,467,941 B2 | 6/2013 | Field et al. | |
| 8,490,723 B2 | 7/2013 | Heinzmann et al. | |
| 8,500,221 B2 | 8/2013 | Kosaka | |
| 8,606,468 B2 | 12/2013 | Kosaka | |
| 8,666,575 B2 | 3/2014 | Kosaka et al. | |
| 8,738,278 B2 | 5/2014 | Chen | |
| 8,978,791 B2 | 3/2015 | Ha et al. | |
| 9,376,155 B2 * | 6/2016 | Ying | B62D 51/001 |
| 2002/0063006 A1 | 5/2002 | Kamen et al. | |
| 2004/0007399 A1 | 1/2004 | Heinzmann et al. | |
| 2004/0055796 A1 | 3/2004 | Kamen et al. | |
| 2005/0134014 A1 | 6/2005 | Xie | |
| 2006/0260857 A1 | 11/2006 | Kakinuma et al. | |
| 2007/0273118 A1 | 11/2007 | Conrad | |
| 2008/0147281 A1 | 6/2008 | Ishii et al. | |
| 2009/0115149 A1 | 5/2009 | Wallis et al. | |
| 2009/0200746 A1 | 8/2009 | Yamamoto | |
| 2009/0288900 A1 * | 11/2009 | Takenaka | B62K 11/007 180/218 |
| 2010/0025139 A1 | 2/2010 | Kosaka et al. | |
| 2010/0225080 A1 | 9/2010 | Smith | |
| 2011/0303475 A1 * | 12/2011 | Kim | B62K 11/007 180/218 |
| 2013/0206493 A1 * | 8/2013 | Larson | A63C 17/12 180/181 |
| 2015/0008058 A1 | 1/2015 | Sato et al. | |
| 2015/0160657 A1 | 6/2015 | Kamen et al. | |
| 2015/0298756 A1 * | 10/2015 | Takeda | B62K 23/08 180/218 |
| 2017/0369118 A1 * | 12/2017 | Dai | B62K 3/002 |

FOREIGN PATENT DOCUMENTS

| | | |
|---|---|---|
| CN | 101920728 A | 12/2010 |
| CN | 301604610 S | 7/2011 |
| CN | 202201103 U | 4/2012 |
| CN | 102514662 A | 6/2012 |
| CN | 102514663 A | 6/2012 |
| CN | 102602481 A | 7/2012 |
| EP | 0 537 698 A1 | 4/1993 |
| EP | 0 958 978 A2 | 11/1999 |
| EP | 1 791 609 B1 | 11/2011 |
| GB | 2 242 173 A | 9/1991 |
| JP | H 0415713 A | 1/1992 |
| JP | H 06273444 A | 9/1994 |
| JP | H 06105415 B2 | 12/1994 |
| JP | 2004359094 A | 12/2004 |
| JP | 2005094898 A | 4/2005 |
| JP | 2005335471 A | 12/2005 |
| JP | 2006001385 A | 1/2006 |
| JP | 2006008013 A | 1/2006 |
| JP | 3981733 B2 | 9/2007 |
| JP | 4411867 B2 | 2/2010 |
| JP | 2010030436 A | 2/2010 |
| JP | 2010030437 A | 2/2010 |
| JP | 2010030438 A | 2/2010 |
| JP | 2010030568 A | 2/2010 |
| JP | 2010030569 A | 2/2010 |
| JP | 2010035330 A | 2/2010 |
| JP | 4442319 B2 | 3/2010 |
| JP | 4572594 B2 | 11/2010 |
| JP | 4599907 B2 | 12/2010 |
| JP | 4600539 B2 | 12/2010 |
| JP | 4702414 B2 | 6/2011 |
| JP | 4710934 B2 | 6/2011 |
| JP | 4798181 B2 | 10/2011 |
| JP | 5131080 B2 | 1/2013 |
| WO | WO 89/06117 A1 | 7/1989 |
| WO | WO 96/23478 A1 | 8/1996 |
| WO | WO 00/75001 A1 | 12/2000 |
| WO | WO 2011/098935 A2 | 8/2011 |
| WO | 2017/066794 * | 4/2017 |

OTHER PUBLICATIONS

Yamafuji et al., Study on the Postural and Driving Control of a Coaxial Bicycle, Paper Read at Meeting of Japan Society of Mechanical Engineering (Series C), May 1988, pp. 1114-1121, vol. 54—No. 501.

KIPO International Search Report and the Written Opinion dated Dec. 2, 2016 for PCT/US2016/050588, 18 pages.

International Preliminary Report on Patentability issued in International Application No. PCT/US2016/050588 dated Apr. 5, 2018, 14 pages.

* cited by examiner

PORTABLE TWO-WHEELED SELF-BALANCING PERSONAL TRANSPORT VEHICLE

CROSS REFERENCE TO RELATED APPLICATIONS

The present application claims the benefit of U.S. provisional application No. 62/222,779, filed Sep. 24, 2015, for a "Self-Balancing Scooter" by Daniel Bryan Laird Edney. This U.S. provisional application is hereby incorporated by reference in its entirety.

BACKGROUND

The invention pertains to two-wheeled, self-balancing electric-powered personal transport vehicles.

Technology for self-balancing vehicles has been well-known to mechanical engineers for many years. For example, more than fifty years ago, U.S. Pat. No. 3,399,742 ("the '742 patent") entitled "Powered Unicycle" issued to an inventor named Malick, and discloses a self-balancing one-wheeled vehicle using a "vertical sensing gyroscope" to relieve the rider of the need to constantly "maintain a vertical balance." When the rider of the unicycle shifts his or her weight forward, the vertical sensing gyroscope senses the shift in weight and causes the wheel to increase rotational speed to compensate for the forward lean. When the rider shifts her weight backward, the vertical sensing gyroscope again senses the shift in weight rearward and causes the rotational speed of the wheel to slow to compensate for the backward shift. Thus, the speed of the vehicle is controlled by the rider "shifting his weight fore and aft" ('742 patent, col. 8, lines 56-68).

U.S. Pat. No. 5,701,965 to Kamen et al., entitled "Human Transporter," teaches a two-wheeled balancing scooter or balancing wheelchair which balances the rider by active control of the wheel to regulate the tilt of the complete vehicle and rider combination in the manner of an inverted pendulum. The rider sits or stands on the vehicle holding a handle, the tilt of the device is measured using angle or level sensors such as gyroscopes, and a control system applies appropriate motor torque to keep the device upright. The rider therefore controls the vehicle's forward and reverse motion by leaning.

Other examples of two-wheeled self-balancing vehicles are disclosed in U.S. Pat. No. 5,791,425 entitled "Control Loop for Transportation Vehicles" issued in 1998 to Dean Kamen et al. ("the '425 patent"). The '425 patent discloses several types of two-wheeled self-balancing vehicles, including a two-wheeled self-balancing vehicle where the rider stands on a platform mounted between the two wheels, grips a set of handlebars that are mounted on a post connected to the platform, and steers with the use of a joystick mounted on the grip of the handle. (See '425 patent, FIG. 21 and col. 9, line 33). The '425 patent also discusses an alternative form of the two-wheeled vehicle that avoids the handlebars and joystick combination by equipping the standing platform on the vehicle with force transducers to detect the rider's leaning. The provided force transducers "sense leftward and rightward leaning" and related controls turn the vehicle left and right "as a result of the sensed leaning." ('425 patent, col. 9, lines 20-23).

The '425 patent also describes the use of a "pitch sensor" to sense the vehicle's pitch and provide it to the electrical motor control loop so that if the rider leans forward or backward, the vehicle drives forward or backward in response to maintain vertical balance. ('425 patent, col. 9, lines 14-20).

More recently, two-wheeled, electric-powered self-balancing vehicles for a standing rider, also commonly known as "hoverboards", have become a well-known, popular form of personal transport vehicle. Conventional hoverboards are self-balancing electric vehicles comprising two platform halves connected by a center pivot, with a wheel mounted on each platform end. Each half generally has at least two sensors, generally a gyroscope and an accelerometer, for detecting angle from gravity and rate of change respectively. Control circuitry and associated software or firmware uses the data from the sensors to independently control the electric motor connected to each wheel and self-balance each platform on either side. Thus, if the user tilts the left foot platform forward, forward torque is applied to the left wheel to drive the left foot platform towards self-balancing. If the user tilts the right foot platform rearward, reverse torque is applied to the right wheel to drive the right foot platform toward self-balancing. If the user tilts the left foot platform forward and the right foot platform rearward, forward and reverse torque is applied to the left and right wheels respectively so that the hoverboard rotates in a generally clockwise direction.

One example of this hoverboard type of two-wheeled electric self-balancing vehicle has been described in U.S. Pat. No. 8,738,278 ("the '278 patent"), entitled "Two-Wheel Self-Balancing Vehicle with Independently Movable Foot Placement Sections", issued on May 27, 2014 to Shan Chen. The '278 patent discloses a two-wheeled self-balancing vehicle that allows the user to ride standing on his or her two feet, with each foot on an independently movable foot placement section (or platform). The rider may thus independently control each wheel by moving each foot placement section independently of the other. Each side of the vehicle has its own position sensor (which may be a "gyroscopic sensor") to sense the pitch (referred to the '278 patent as "tilt" or sometimes just "position") of the platform. The sensors provide independent measurement of the position of the respective platform boards, and the sensed position information is used to drive the corresponding motors and wheels connected to each platform ('278 patent, col. 3, lines 4-11). In such a scooter having independently tilting foot positions, steering is achieved by the user tilting the left and right sections at different angles to cause differential motion of the left and right wheels. Separate motors provide independent control over the driving of the wheel associated with each foot placement section.

The '278 patent also discloses an alternative form of the two-wheel self-balancing vehicle where a single frame or housing may be used to enclose the two independently moveable foot placement sections, but the single frame or housing remains "sufficiently flexible" that the two halves of the board are "effectively" two sections that "move independently" with respect to each other for "independent control" of the wheels. (See '278 patent, col. 4, lines 27-33).

Two-wheeled self-balancing electric vehicles have thus been known in the art for many years. Balancing two-wheeled scooters known in the art use either handle inputs, rider lean input, or independently movable foot sections to provide steering or turning input.

The conventional hoverboard configuration has several known disadvantages. Each foot platform side requires an independent set of position sensors, one for the left side and one for the right side, where each set generally includes a gyroscope and an accelerometer, thus adding cost, weight and complexity. The independently tilting foot position scooter has the further disadvantage where the independent balance control algorithms of the two sides may cause unwanted motion and instability while stepping onto or off the scooter, increasing the risk of injury to the rider.

The center pivot typically used to provide independently tilting foot positions also adds cost, weight and complexity to the hoverboard, while the independently tilting sides may be perceived as less stable and hence more dangerous by the user. The independently tilting sides also make the conventional hoverboard cumbersome for the user to hold, as the requirement that each side be separately moveable generally precludes the provision of a handle or any other rigid structure that spans the two sides. This makes it difficult for the user to carry the hoverboard comfortably in one or even both hands. Further adding to the cumbersome nature of the hoverboard, the existence of the center pivot forces the battery for the electric motors and the control circuitry to be located on either the left or the right side of the hoverboard, rather than more optimally at the center of gravity in the center of the hoverboard.

Furthermore, a hoverboard configured in the conventional manner requires additional means for detecting the presence of a rider. Certain modes of operation require the detection of the weight of a rider on each side. Conventional sensors used in electric-powered self-balancing vehicles for detecting angle from gravity and rate of change, such as gyroscopes and accelerometers, do not have the ability to detect the weight of objects, such as a rider present on the hoverboard. Accordingly, additional sensors, such as photoelectric sensors, are typically used to detect presence or absence of weight on each side. These additional sensors can add cost and complexity to the construction of the hoverboard. In addition, such sensors generally confirm the presence of weight above a certain threshold and give a binary yes/no result. They cannot measure the amount of weight applied above the threshold, and therefore cannot determine whether the total weight is above a stated limit, or describe how the weight is distributed or balanced across the device.

SUMMARY

A portable two-wheeled self-balancing personal transport vehicle provides increased stability by utilizing a single support platform. An embodiment of the present invention provides a single support platform housing, wherein the support platform housing encloses an interior space for housing a battery power source and control circuitry for the vehicle. One exemplary embodiment of the present invention comprises one or more inertial sensors operable to provide pitch data for the platform, a first foot placement section and a second foot placement section. The vehicle is two-wheeled, having a first wheel associated with the first foot placement section and a second wheel associated with the second foot placement section, the first and second wheels being spaced apart and substantially parallel to one another, where each wheel is independently driven by an associated motor. The vehicle is controlled using data from at least one load sensor operable to provide first load data for the first foot placement section and at least one load sensor operable to provide second load data for the second foot placement section. In an exemplary embodiment of the invention, the first and second load data each comprise data from two load sensors, where the first load data comprises a first front load data and a first rear load data, and the second load data comprises a second front load data and a second rear load data. Control circuitry is connected to the first and second drive motors, and operable to transmit signals to the first and second wheels for self-balancing the support platform housing in response to the pitch data, and further operable to transmit one or more torque signals to the first and second wheels in response to the first and second front and rear load data elements for steering or determining a direction of travel for the vehicle. In an exemplary embodiment of the invention, at least one carrying handle spans substantially a length of one side of the support platform housing and comprises an integrated part of the support platform housing.

These and other embodiments are more fully described below.

BRIEF DESCRIPTION OF THE DRAWINGS

The novel features of the invention are set forth in the appended claims. However, for purposes of explanation, several aspects of particular embodiments of the invention are described by reference to the following figures.

FIG. 3a is a top view of a chassis structure of a two-wheeled, self-balancing personal transport vehicle with a single platform section in accordance with an embodiment of the present invention.

FIG. 3b is a side elevation view of the embodiment of a chassis structure shown in FIG. 3a.

FIG. 3c is a front elevation view of the embodiment of a chassis structure shown in FIG. 3a.

FIG. 4a is a top view of a chassis structure of a two-wheeled, self-balancing personal transport vehicle with a single platform section in accordance with another embodiment of the present invention.

FIG. 4b is a side elevation view of the embodiment of a chassis structure shown in FIG. 4a.

FIG. 4c is a front elevation view of the embodiment of a chassis structure shown in FIG. 4a.

DETAILED DESCRIPTION

The following description is presented to enable any person skilled in the art to make and use embodiments of the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
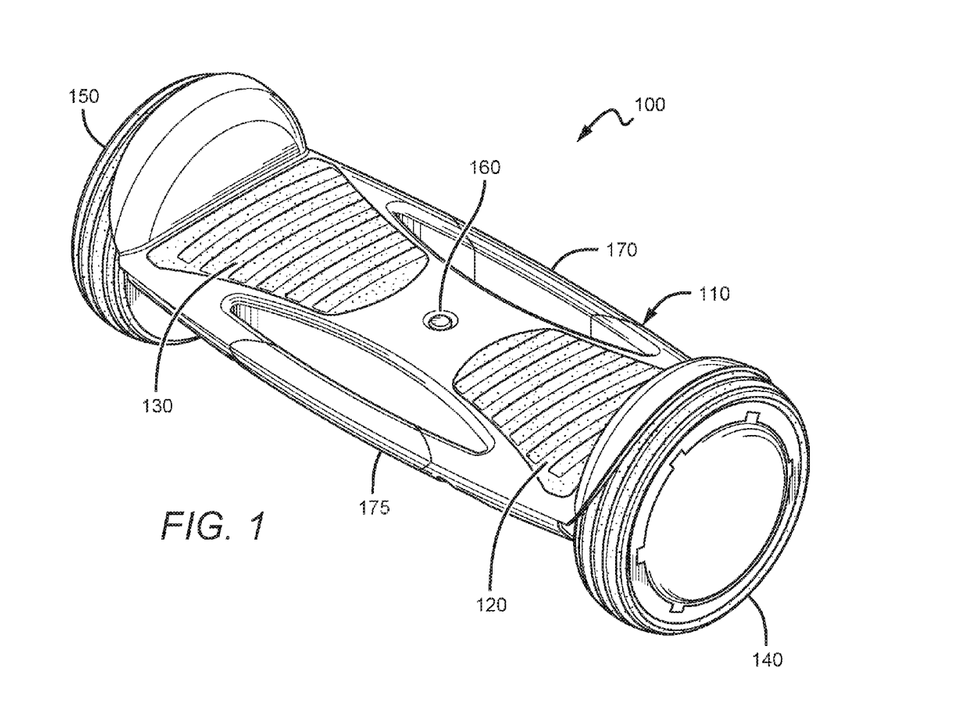
FIG. 1 is a perspective view of a two-wheeled, self-balancing personal transport vehicle with a single platform section in accordance with an embodiment of the present invention.

Referring to FIG. 1, a perspective view of a two-wheeled, self-balancing personal transport vehicle (also referred to herein as a "vehicle", "hoverboard" or "scooter") with a single platform section in accordance with an embodiment of the present invention is shown.

Vehicle 100 comprises a single platform section 110. The platform section 110 may be constructed of metal, sturdy plastic, wood or other substantially rigid material. The platform section includes first and second foot placement sections or areas 120 and 130 respectively. In one embodiment, platform section 110 may be composed of one or more pieces, e.g. a top and bottom pieces that may fit together and be fastened together with screws, clips, bolts or the like, and contain space when fastened together that can enclose and include a chassis structure that will provide additional support for the platform section as well as support for control circuitry, force sensors, batteries and other components.

The first and second foot placement sections are preferably each of sufficient size for the foot of a user standing on it. The first and second foot placement sections 120 and 130 may be formed as an integrated part of the platform section 110 or may be affixed on a surface of platform section 110. First and second foot placement sections 120 and 130 may include a tread with grooves or other raised surfaces made out of rubber or other materials for foot traction and/or comfort as a user (e.g., a rider) stands on the platform. Wheels 140 and 150 are positioned on two parallel sides of platform section 110. In a preferred embodiment, each wheel includes an integrated driving motor (not shown in FIG. 1) and is preferably connected to the platform section 110 by an axle (also not shown in FIG. 1). Platform section 110 may act as a housing structure for a chassis to provide mechanical support and structure for the vehicle, as well as a platform to position a battery to power the motors. Platform section 110 may also include internal control circuitry and sensor components as further described in this section.

In a preferred embodiment, a single push button 160 may be disposed on a surface of the vehicle platform section 110 to turn the unit on or off. Most preferably, push button 160 may also be illuminated by multicolored LEDs to signal the state of the device as described further below.

In one embodiment, the color and light patterns of flashing, intermittent flashing or steady light can indicate the state of the vehicle. In an exemplary embodiment, the push button LED lights can signal the following vehicle states: power off, balancing mode with strong battery, balancing mode with partially depleted battery, low battery, very low battery, sleep, stopped mode, balancing error, and test.

In one embodiment, an audio indication output may also be present on the vehicle, or may be sent to a user's smart phone or other computing device via Bluetooth or other wireless or wired connection. The output preferably makes different distinctive beeps, tones, spoken words, tunes or other noises indicating status such as: power on, power off, low battery, operational or balancing error.

In a preferred embodiment, one or more carry handles 170 and 175 may be included along one or both lengthwise sides of the platform between the two wheels to facilitate easy hand carrying of the vehicle 100. More preferably, handles 170 and 175 are each bisected by a lateral midpoint along the lengthwise side of the platform. In one embodiment, each handle 170 and 175 is integrated as part of platform section 110 and provides an opening in platform section 110 to comfortably fit a user's hand and allow a user to comfortably grip the vehicle 100. Alternatively, carry handles 170 and 175 may be separately attached (such as via clips or belts) to platform section 110 when hand carrying the vehicle so as to maximize the available standing surface of platform section 110, or even folded underneath platform section 110 when not in use.

Figure 2:
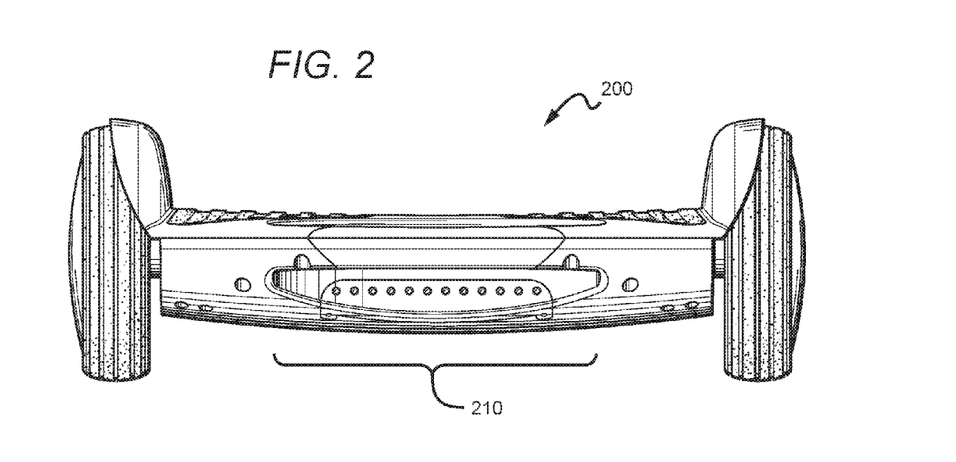
FIG. 2 is a front elevation view, the rear view being a mirror image, of the embodiment shown in FIG. 1.

In a preferred embodiment, a set of running lights may be included on the each of the front and rear sides of the vehicle platform. Most preferably, each set of running lights is a strip of red and white LEDs. The white LEDs are illuminated on the front side based on the current direction of motion, and the red LEDs are illuminated on the rear side when the vehicle is in motion. When stopped, the red LEDs may be illuminated on both sides. An embodiment of the vehicle 200 of the present invention showing a front view of the vehicle 200 with a set of LED running lights 210 is shown in FIG. 2.

The vehicle 200 may have several modes of operation. In a preferred embodiment, the modes of operation are as follows. On startup, the vehicle performs a self-test. In one embodiment of the invention, if the detected weight is near zero, and stable, and the unit is not upside down or in another wrong position (such as when the support platform is tilted too far downward or upward), and not significantly in motion, the control circuitry will null (or "tare") the load sensors. This means that any offsets or drift in the zero reading are removed by treating the null/tare reading to be zero and subtracting it from any future readings. Other modes of operation include:
  Sleeping (minimal power use);
  Stopped (resists motion to allow easy user mount and dismount);
  Balancing (normal riding with active control of balance and steering or turning); and
  Off (fully powered down).

In some embodiments, the vehicle controller has a Locked mode of operation. Such mode can be entered into or exited from by signals from a radio frequency (RF) communication module configured to provide communications with a portable electronic device or other electronic device capable of radio frequency identification. When in Locked mode, the controller will not drive the motors in the normal way and will therefore not allow the vehicle to be used until Locked mode is exited. The portable electronic device may be a smart phone, tablet, portable computer, keyfob, or other device known to the art. The RF communication module may use the Bluetooth Low Energy protocol, RFID or any other communication protocols known in the art. The vehicle may indicate that it is in Locked mode by means of a visual indicator such as an LED colored illumination or illumination pattern on LED running lights 210, or by means of an audible indicator such as emitting a beep, tone or spoken notification, or simply by not functioning (e.g. wheels do not move).

In a preferred embodiment, transitions between modes may occur as follows:
  Sleeping to Stopped: Transition occurs when any motion or weight is detected;
  Sleeping to Off: Transition occurs after a predefined time period (e.g. 15 minutes);
  Stopped to Sleeping: Transition occurs when no weight or motion is detected for a predefined time period (e.g. 1 minute);
  Stopped to Balancing: Transition occurs when the weight on both feet is above a predefined threshold (e.g. 10 kg) and the board is close to upright;
  Balancing to Stopped: Transition occurs when the speed is below a predefined threshold (e.g. 0.5 m/s) or the weight on one foot is below a predefined threshold (e.g. 5 kg);

Off to Stopped: If the power button 160 is pressed; and

Any other mode to off: If the power button 160 is pressed, or if the battery is depleted.

The single platform of the vehicle in one embodiment of the invention is balanced by active control based on gyro and orientation sensors which provide pitch or tilt data to control circuitry located inside the vehicle housing. Steering or turning is achieved by load sensors located under each of the user's feet. In a preferred embodiment, the load sensors are positioned under each of the first and second foot placement sections of the platform, near the outside edge of each foot placement section, in relative proximity to the wheel. In an exemplary embodiment, the load sensors are operable to sense force, such as the weight of a user, and a set of at least two or more load sensors under each foot placement section measure weight distribution on a front section and a rear section of each foot. When only one of the rider's feet is on the board during mounting or dismounting, the board may resist motion so that it stays still.

Figures 3A, 3B, 3C, 4A, 4B, 4C:
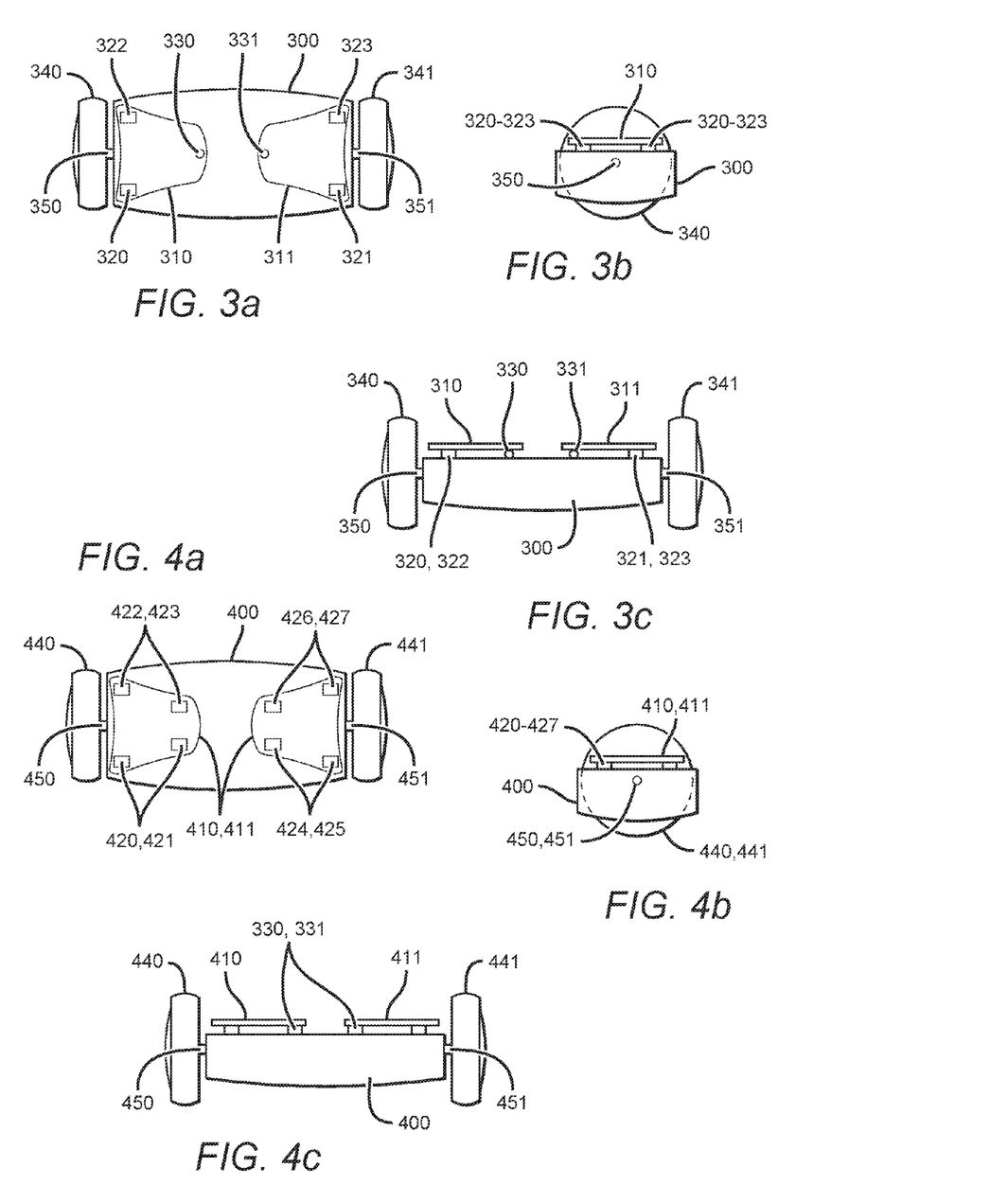

FIG. 3a shows a top view of a vehicle chassis 300 in accordance with one embodiment of the present invention. FIGS. 3b and 3c show side elevation and front elevation views respectively of the vehicle chassis shown in FIG. 3a. In FIGS. 3a, 3b, 3c, and 4a, 4b and 4c, the single platform housing has been removed from the vehicle shown in FIG. 1. Chassis structure 300 as shown in FIGS. 3a-3c may be composed of metal or other rigid material and may be connected to two motor axles that may support wheels 340 and 341 and allow such wheels to rotate about their axles 350 and 351. In one embodiment, foot platforms 310 and 311 are positioned on a top surface of chassis 300, and are connected to the chassis 300 via load sensors 320, 321, 322, 323 which are positioned on the top surface of the chassis and under the foot platforms 310 and 311, near the outside corners of the chassis closest to wheels 340 and 341. In a preferred embodiment, support pivots 330 and 331 are also positioned on the top surface of the chassis and connected to foot platforms 310 and 311, near the edge of the foot platforms that are closest to the center of the chassis, where pivot 330 is substantially on the other side of the foot placement section from load sensors 320 and 322, and pivot 331 is substantially on the other side of the foot placement section from load sensors 321 and 323. The support pivots 330 and 331 may be advantageously included to provide structural support to the load sensor mechanisms, particularly as they do not appreciably interfere with the operation of the load sensors. In addition, the pivot members do not cause significant torque on the foot platform as the weight on the foot platform shifts frontward and rearward. In a preferred embodiment, the upwards facing surfaces of the support pivots 330 and 331 are hemisphere-shaped, like surfaces of ball bearings. The upper portion of support pivots 330 and 331 may be fixed on the foot platforms 310 and 311 respectively. Support pivots 330 and 331 function to provide vertical support to the foot platforms and foot placement sections, and therefore help ensure that changes in the load from the user shifting her weight are borne primarily by one or more of the load sensors.

FIG. 4a shows a top view of a vehicle chassis 400 in accordance with another embodiment of the present invention. FIGS. 4b and 4c show side elevation and front elevation views respectively of the vehicle chassis shown in FIG. 4a. In FIGS. 4a, 4b and 4c, the single platform housing has been removed from the vehicle shown in FIG. 1. Wheels 440 and 441, axles 450 and 451 and foot platforms 410 and 411 are similar in function to their counterparts shown in FIGS. 3a-3c. In FIG. 4a, foot platforms 410 and 411 are each supported by four load sensors: foot platform 410 by load sensors 420, 421, 422 and 423, and foot platform 411 by load sensors 424, 425, 426 and 427. Each of the load sensors are connected between chassis 400 and a foot platform, where each load sensor is positioned in proximity to a corner of a foot platform.

It is to be understood that the term "load sensor" can refer to any sensor assembly or force transducer that gives a measurement of the amount of force applied to it, a wide variety of which may be known to those skilled in the art. In preferred embodiments of the present invention, the force applied to the load sensors is the user's weight, which can be described as a "load". In some embodiments, the load sensor can include, without limitation: a strain gauge affixed to a structural member, pressure sensitive resistive material, a sensor which measures the deflection of elastic members, a membrane switch with resistance that depends on pressure, piezoelectric material, or combinations of the above.

Figure 5:
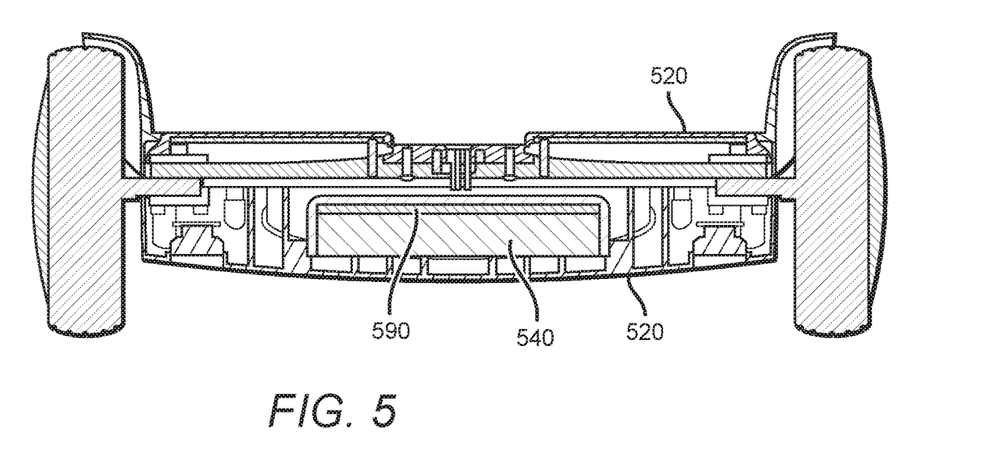
FIG. 5 is a front elevation cross sectional view of an embodiment of the present invention shown in FIG. 1.
Figure 6:
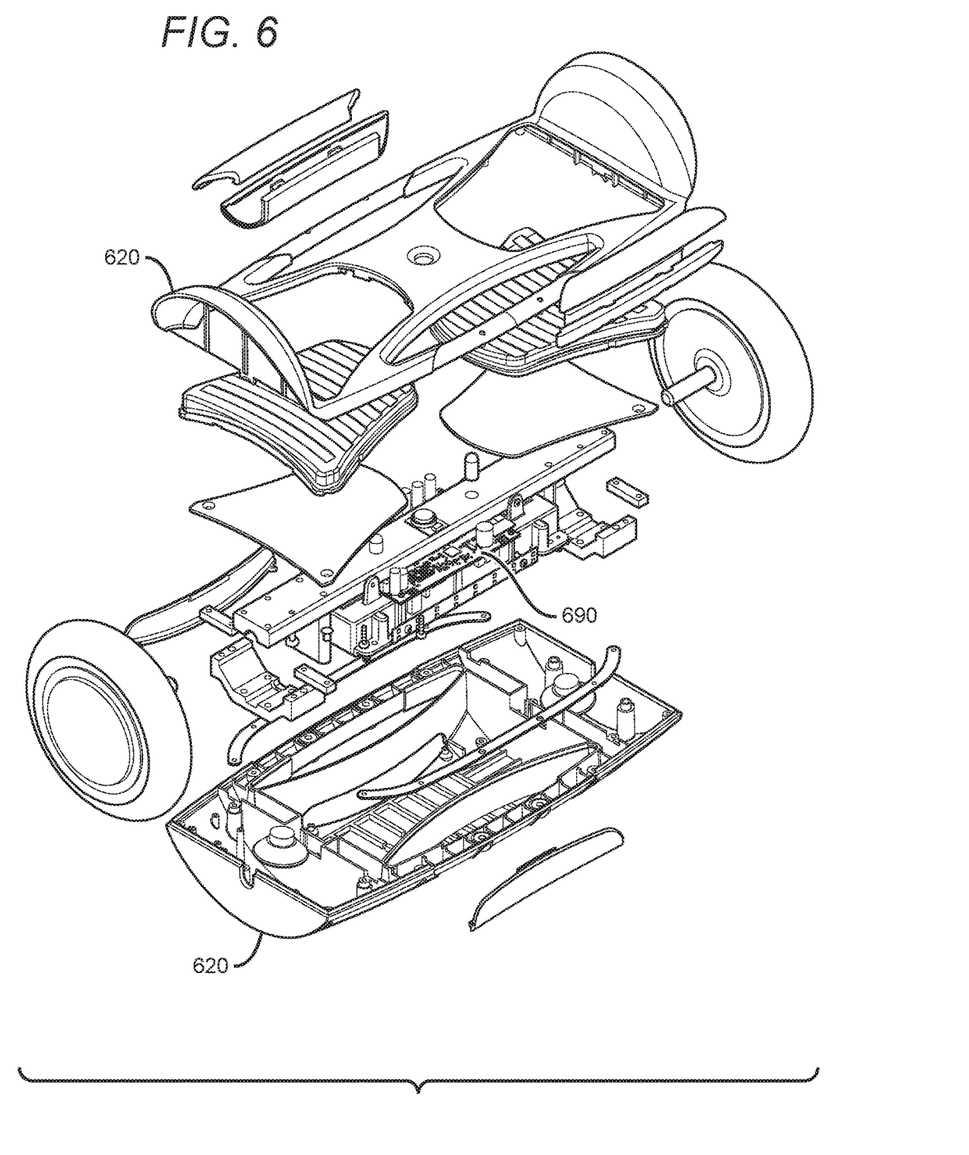
FIG. 6 is an exploded top perspective view of an embodiment of the present invention shown in FIG. 1.

FIG. 5 is a front elevation cross sectional view of an embodiment of the present invention shown in FIG. 1, and shows the location of battery pack 540 and circuit board plate 590 for holding control circuitry within the platform housing 520. FIG. 6 is an exploded top perspective view of an embodiment of the present invention shown in FIG. 1, and also shows control circuitry via printed circuit board (PCB) 690 within the platform housing sections 620.

In an embodiment of the present invention, the control circuitry contains a control system that is configured to cause the wheels to balance the single vehicle platform. The control system uses inertial sensors to sense single pitch and angular velocity values for the vehicle. When the board pitches forward from a neutral position, the wheels are driven in a forward direction. When the board pitches backward from a neutral position, the wheels are driven in a reverse direction. Accordingly, the rider/user can move the vehicle forward and backward by pitching the board forward and back.

In some embodiments, the vehicle has a steering system to control steering or turning of the vehicle whereby the control circuitry is configured to control each wheel independently by modifying the torque of the associated motor based on the forward-back weight distribution on both foot platforms. Steering includes turning or otherwise controlling the direction of the vehicle's movement.

In some embodiments, torque to be applied to each of the left and right wheels is determined by control circuitry logic. In some embodiments, the control circuitry utilizes both balance-related input and steering-related input. Furthermore, the control circuitry logic may be designed to provide output that reflects torque required for both balance and steering. Based at least in part on the balance-related input and the steering-related input, the control circuitry may provide output including the amount and direction of torque to be applied to each of the first and second (or left and right) wheels. In some embodiments, the balance-related input may be provided using inertial sensors including a gyroscope and an accelerometer. In some embodiments, the steering-related input may be provided using one or more load sensors on the left side of the platform, and one or more load sensors on the right side of the platform, which may preferably be located in proximity to the foot placement section. For example, some embodiments of the invention provide at least two load sensors per foot placement section. Other embodiments may include at least four load sensors per foot placement section. Still other embodiments may include at least eight load sensors per foot placement section. The sensors may be arranged in various configurations and arrangements known in the art. In a preferred embodiment, each side has two load sensors and one support pivot arranged as shown in FIGS. 3A-3C.

In some embodiments, separate left side load sensor input and separate right side load sensor input may be utilized as steering-related input. The left side load sensor input may include input from one or more load sensors on the left side, and the right side load sensor input may include input from one or more load sensors on the right side. The control circuitry may integrate the left side load sensor input and the right side load sensor input, as well as the balance-related input to generate torque signals that are applied to the motors driving the wheels. Optionally, the determination of steering torque to be applied to the right wheel may be based on load sensor input from only the right side, and the determination of steering torque to be applied to the left wheel may be based on load sensor input from only the left side. Furthermore as discussed above, in some embodiments of the invention, the determination of total torque that may be applied to the first and second wheels may also be based in part on data received from the inertial sensors. In some embodiments of the invention, the inertial sensor data may relate to the platform as a whole rather than to a particular one of the two foot placement sections.

In some embodiments, balance-related sensor data and steering-related sensor data may be processed separately in the logic of the control circuitry. In a preferred embodiment of the invention, a first weight differential between a toe portion and a heel portion of the first foot placement section may differ from a second weight differential between a toe portion and a heel portion of the second foot placement section, and both differentials may be used to determine steering torque signals to be applied to each wheel.

As discussed above, in some embodiments of the present invention, the control circuitry uses the data from the load sensors to control steering of the single vehicle platform. For instance, if the user shifts her weight toward her left toes and right heel, the vehicle will turn right. If the user shifts her weight to her left heel and right toe, the vehicle will turn left. Steering input is thus determined in part by the extent that the user has weight forward on one foot and back on the other foot. In a preferred embodiment, if one foot is below a predetermined weight threshold (e.g., either less than 1 kg or 5% of the other foot's weight), then the steering input is set to zero.

In one embodiment, steering input may be measured as follows: SteeringInput=(WeightFrontLeft−WeightBackLeft+WeightBackRight−WeightFrontRight)

In an alternate embodiment, steering input may be calculated as follows: SteeringInput2=TotalRiderWeight* ((WeightFrontRight−WeightBackRight)/RightWeight (WeightFrontLeft−WeightBackLeft)/LeftWeight))

Figure 7:
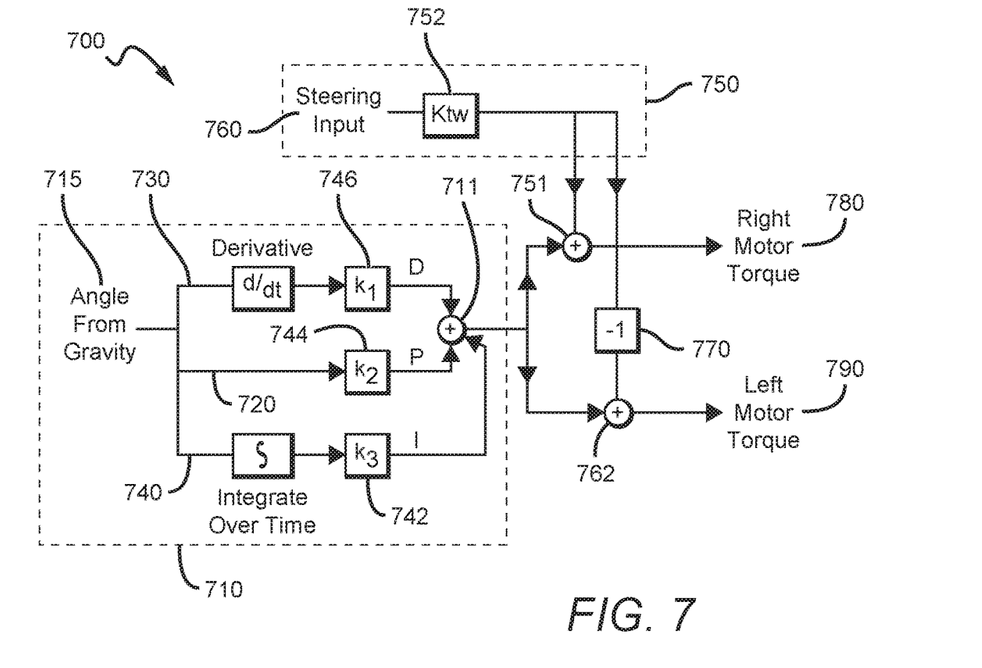
FIG. 7 is a block diagram of a control system 700 for an embodiment of the present invention shown in FIG. 1.

FIG. 7 is a block diagram of a control system 700 for an embodiment of the present invention. In embodiments of the present invention, control system 700 may be implemented as part of the control circuitry for the vehicle. The control circuitry may be implemented as hardwired logic, programmable logic, firmware, or software. Balancing control circuitry 710 supplies balancing control. Balancing control circuitry 710 uses pitch data 715 (also called "angle from gravity") supplied by a single six-axis motion sensor that includes a gyroscope and accelerometer (though the balancing control circuitry may not use output for all six of the axes). The balancing control circuitry 710 takes into account both the angle (circuit branch 720) as well as how fast the angle is changing (d/dt) in top branch 730. In addition, an integral branch 740 may be included to overcome sloped ground and to allow continuous motion without the user needing to constantly lean in the direction of desired motion. In an alternate embodiment, the output from the integral branch 740 may be limited or bounded. In an exemplary embodiment, the integral may be bounded to an amount less than the maximum torque of the vehicle motor. In a preferred embodiment, the integral is bounded to between 25-75% of the vehicle motor's maximum continuous rated torque.

From these three branch components 720, 730 and 740, balancing control circuitry 710 calculates the torque that is supplied to both wheels to balance the board. Proportional branch component 720 is adjusted by a coefficient k2 shown at box 744. Derivative branch component 730 is adjusted by a coefficient k1 shown at box 746. Integral branch component 740 is adjusted by a coefficient k3 shown at box 742. Coefficients k1, k2 and k3 are constants that are dependent on implementation of the vehicle. Summing circuit 711 outputs the balancing torque control signal (e.g. TorqueBalance). Note that there is only one balancing output signal from summing circuit 711 and it provides the same signal to control the balancing torque for both wheels.

Steering control circuitry 750 supplies steering control. As discussed above, the user/rider triggers a steering control signal by shifting her weight on the load sensors. Steering input 760 comprises the output of the load sensors described above. Steering input 760 may be adjusted by coefficient Ktw as shown at box 752. Whatever steering torque signal is provided for controlling the right wheel, the opposite torque signal may be supplied for controlling the left wheel. The "−1" box 770 represents converting the steering torque signal supplied to the right motor to the inverse value for controlling the left motor. The torques applied to each wheel, right motor torque 780 and left motor torque 790, is therefore a function of a balancing torque signal (which is the same for both wheels) and a steering torque signal (which is different for each wheel when the user is steering left or right), via summing circuitry 751 and 762.

Thus in some embodiments, the wheel torque that the control circuitry is configured to cause the motor to generate is determined from both the torque required to balance the vehicle and a steering torque that is based on the weight distribution of the foot platforms as discussed above. The steering torque adjustment is applied to the balancing torque, forward on one wheel and back on the other. In one embodiment, the total torque for each wheel may be adjusted by a constant Ktw, shown as reference 752 in FIG. 7, as in the formulas shown below:

TorqueLeftWheel=TorqueBalance−$K_{tw}$*SteeringInput

TorqueRightWheel=TorqueBalance+$K_{tw}$*SteeringInput

The torque applied to the vehicle motor results in a force being applied to the ground by the wheels on each side. If this force is not the same on each side of the vehicle, then a net turning force exists on the vehicle which will cause the vehicle and rider to rotate. To steer, the rider applies an unbalanced set of forces across the front and rear of the first and second foot placement sections and platforms, defined above as the SteeringInput force.

In some embodiments, the coefficient Ktw may be adjusted based on the average rider weight measured over some period of time. In addition, in some embodiments, the vehicle may have a speed sensor, and the control circuitry may be configured to reduce the effect that shifts in weight, as measured by the load sensors, have on wheel torque as speed increases. In the case of the coefficient Ktw, this may be implemented as a reduction in magnitude of Ktw at higher speeds. In some embodiments, it is also possible that the vehicle's stability will benefit from having a yaw suppression function, at least at higher speeds. For example, the function, SteeringInput3=SteeringInput−Ky*YawRate, may have the effect of reducing the effect of disturbances on the yaw.

In a preferred embodiment, the coefficient Ktw is selected by the control circuitry as discussed below, and the net steering force applied to the ground on each side is a product of the coefficient Ktw and of the SteeringInput force input provided by the rider. Preferably, the selection of the coefficient Ktw varies depending on the speed of the vehicle. In a preferred embodiment, at a vehicle speed of less than 1 meter per second, Ktw is selected such that the net steering force is greater than 0.2 times the force input provided by the rider, and more preferably in the range of 1.4-0.4 times the force input provided by the rider. In a preferred embodiment, at a vehicle speed of 1 to 3 meters per second, Ktw is selected such that the net steering force is in the range of 0.1-1.0 times the force input provided by the rider, and more preferably in the range of 0.15-0.6 times the force input provided by the rider. In a preferred embodiment, at a vehicle speed greater than 3 meters per second, Ktw is selected such that the net steering force is less than 0.4 times the force input provided by the rider, and more preferably in the range of 0.25-0.01 times the force input provided by the rider.

In some embodiments, the control circuitry 700 has a Stopped mode of operation where the motors are controlled to resist motion, a mode which may be entered when the weight on one of the foot platforms is less than a certain threshold. This Stopped mode of operation can allow the user to comfortably mount and dismount the vehicle. The user may safely mount or dismount even if the Stopped mode does not completely prevent the scooter from moving, but supplies enough resistance to allow the user to more comfortably balance herself as she steps on or off the vehicle.

In some embodiments, the motor torque that generates motion resistance for the Stopped mode is calculated for each wheel independently based on wheel position relative to a fixed position reference. The fixed position reference may be the recorded position of the wheel when the Stopped mode was entered or the vehicle was powered on. The wheel position may be determined from a wheel position sensor such as a magnetic encoder on a motor integrated in the wheel, in which the full turns of the wheel may be taken into account.

In some embodiments, when in Stopped mode, the torque that the control circuitry causes the motor to generate is calculated proportionally to the measured speed of said wheel:

$$T=-K*S$$

Where T is the torque for the wheel, S is the measured speed of the wheel, and K is a constant selected to produce the desired level of resistance.

In some embodiments, the torque used to cause the motion resistance is calculated using a Proportional plus Derivative (PD) rule based on the position and speed of the wheel. For example, $$T=K2*(X-Xs)+-K1*dX/dt$$

Where T is motor torque, X is wheel position, Xs is the position reference, dX/dt is rate of change of wheel position, and K1 and K2 are constants that are dependent on implementation. In an embodiment, K2 may equal zero such that the vehicle resists movement only when it is in motion.

It is understood that the torque applied to the wheels to cause the disclosed motion resistance effect can be calculated using a variety of methods known to the art, of which the above are merely examples.

In some embodiments, control circuitry for the vehicle may passively generate the motion resistance torque by causing the motor driver to connect both ends of a winding together such that whatever current is generated by the motor turning continues to circulate in the winding and therefore generates torque to oppose the motion. This method has the advantage of not requiring significant additional power to be drawn from the battery into the motor windings.

In Stopped mode, the balancing algorithm is applied as above, except the parameters may be modified to make the movement gentler. Additionally, Ktw and k3, referenced as 752 and 742 respectively in FIG. 7, may be zero in Stopped mode. Because a transition from Stopped to Balancing mode may be allowed only when the board is close to upright, the difference in balancing torque immediately after transition may not be large. This allows a smooth transition from one mode to another. In an embodiment of the present invention, during transition from stopped mode to balancing mode, there is a linear ramp from the stopped to the balancing mode applied over a short time interval, preferably in the range of 800 ms. In an embodiment of the present invention, Stopped mode has an additional torque calculated that is added to each motor in proportion to its speed as described above.

As described above, all control circuitry may be contained on a single printed circuit board 690 as shown in FIG. 6. In an embodiment of the present invention, the control circuitry comprises:

a 16-bit microcontroller/DSP;
a 6-axis motion sensor (gyroscope and accelerometer). In an embodiment, the yaw and roll axes may be unused and powered down by software;
4 load cell inputs with adjustable null offsets (load sensors);
6 H-bridge power drivers, 3 for each motor;
A current sensor on the lower leg of each H-bridge;
A current sensor on the return to the battery;
2 motor position sensor inputs;
RGB LEDs;
LED strip driver output; and
Battery, charge input and motor phase voltage monitors.

In some embodiments of the present invention, the motor control is accomplished in the normal way for sensored brushless motors. The phase of the 3 H-bridges is determined by the sensor input. The current/torque is measured and controlled by a feedback loop that modulates the pulse width modulation (PWM) to maintain the current set point. In a preferred embodiment, the modulation scheme may be Space Vector Modulation.

In an embodiment of the present invention, the motor torque is limited by limiting the maximum current to each motor to one that the motors can safely handle. The total motor torque is also limited such that the battery current does not exceed the permitted maximum. When torque is limited, active balancing control cannot be maintained if any additional lean occurs in the direction of motion. In that case, the rider may start to fall forward and may fall off or need to jump from the vehicle before falling. In some embodiments of the present invention, the vehicle may have temperature sensors in the motors and preferably also on the motor driver transistors. The maximum motor current allowed is reduced as these temperatures rise above selected thresholds.

In an embodiment of the present invention, an operational alarm indicates a potential balancing issue. Preferably, the operational alarm is triggered when any of the following conditions are met:

Average PWM is above 85% of its maximum (this is equivalent to the voltage being applied to the motors being above 85% of the battery voltage, which can occur at high vehicle speeds or under heavy vehicle loads);

Motor current is above 90% of its maximum for more than 0.5 seconds (this may occur under heavy vehicle load at lower speeds);

Motor driver transistor temperature is above a predefined threshold (e.g., 55 degrees Celsius); and Motor winding temperature is above a predefined threshold (e.g., 66 degrees Celsius).

Additional embodiments of the present invention may include enhanced features. For example, the single platform housing of the vehicle may include a Bluetooth or other wireless-enabled audio speaker system. The housing may also include additional integrated lighting that may be modulated by sound from the speaker system or specific motions of the vehicle. Preferably, any Bluetooth or other data connection integrated in the vehicle may include control circuitry, software or firmware to allow user notification of alarms from the vehicle, or control of the vehicle speakers, movement, lights, etc. by a mobile app accessible via smart phone, tablet or other personal computing device. For example, one embodiment of the present invention may include a mobile application accessible via smart phone, tablet or other portable personal computing device that would allow a user to steer the vehicle remotely by activating portions of a touchscreen or activating gyroscope or accelerometer sensors on the smart phone to power on/off, speed up, slow down, turn, or tilt the vehicle. In one embodiment, a remote control joystick or other input device could also enable a user to remotely control steering, tilt, acceleration, deceleration and power on/off functions of the vehicle.

While the present invention has been particularly described with respect to the illustrated embodiments, it will be appreciated that various alterations, modifications and adaptations may be made based on the present disclosure, and are intended to be within the scope of the present invention. While the invention has been described in connection with what are considered to be the most practical and preferred embodiments, it is to be understood that the present invention is not limited to the disclosed embodiments, but on the contrary, is intended to cover various modifications and equivalent arrangements included within the scope of the appended claims.

What is claimed is:

1. A self-balancing transport vehicle, comprising:
   a support platform housing comprising one or more inertial sensors operable to provide data indicating the pitch of the support platform, a first foot placement section and a second foot placement section;
   a first wheel associated with the first foot placement section and a second wheel associated with the second foot placement section, the first and second wheels being spaced apart and substantially parallel to one another;
   a first drive motor configured to drive the first wheel and a second drive motor configured to drive the second wheel;
   at least one load sensor operable to provide first load data for the first foot placement section and at least one load sensor operable to provide second load data for the second foot placement section, wherein the first load data comprises a first front load data and a first rear load data of the first foot placement section and the second load data comprises a second front load data and a second rear load data of the second foot placement section; and
   control circuitry connected to the first and second drive motors, and operable to transmit balancing torque signals to the first and second wheels for self-balancing the support platform housing in response to the pitch data, and further operable to transmit steering torque signals to the first and second wheels in response to the first and second load data, wherein a net steering torque signal of the control circuitry comprises a product of a first factor and a second factor, wherein the first factor comprises a steering force input provided by the first load data and the second load data, and wherein the second factor comprises a constant coefficient that varies depending on the speed of the vehicle.

2. The self-balancing transport vehicle of claim 1, further comprising at least one carrying handle disposed along a first portion of the support platform housing comprising a lateral mid-point of the housing.

3. The self-balancing transport vehicle of claim 2, wherein the at least one carrying handle substantially spans the length of one side of the support platform housing.

4. The self-balancing transport vehicle of claim 1, wherein at least two load sensors are operable to provide the first front load data and first rear load data for the first foot placement section and at least two load sensors are operable to provide the second front load data and second rear load data for the second foot placement section.

5. The self-balancing transport vehicle of claim 4, wherein the at least two load sensors operable to provide the first load data for the first foot placement section and the at least two load sensors operable to provide second load data for the second foot placement section are arranged in association with each of the first and second foot placement sections to generate signals to determine weight differentials between a heel portion and a toe portion of each foot placement section.

6. The self-balancing transport vehicle of claim 5, wherein the control circuitry is configured to transmit one or more signals to adjust steering rightward when the weight differentials indicate weight shifts toward the left toe portion of the first foot placement section and the right heel portion of the second foot placement section.

7. The self-balancing transport vehicle of claim 5, wherein the control circuitry is configured to transmit one or more signals to adjust steering leftward when the weight differentials indicate weight shifts toward the left heel portion of the first foot placement section and the right toe portion of the second foot placement section.

8. The self-balancing transport vehicle of claim 1, wherein at least four load sensors are operable to provide the first load data for the first foot placement section and at least four load sensors are operable to provide the second load data for the second foot placement section.

9. The self-balancing transport vehicle of claim 1, wherein the load sensors are mounted on a chassis structure inside the support platform housing.

10. The self-balancing transport vehicle of claim 9, wherein the at least one load sensor operable to provide first load data for the first foot placement section supports a first foot plate positioned underneath the first foot placement section, and the at least one load sensor operable to provide second load data for the second foot placement section supports a second foot plate positioned underneath the second foot placement section inside the support platform housing.

11. The self-balancing transport vehicle of claim 10, further comprising at least two pivot members mounted on the chassis structure, wherein at least one pivot member supports the first foot plate and is positioned underneath the first foot placement section on the side opposite the at least one load sensor operable to provide the first load data, and at least one pivot member supports the second foot plate and is positioned underneath the second foot placement section on the side opposite the at least one load sensor operable to provide the second load data.

12. The self-balancing transport vehicle of claim 1, wherein the control circuitry is operative to determine the presence and absence of weight applied to the support platform housing based on data supplied by the at least one load sensor.

13. The self-balancing transport vehicle of claim 1, wherein the control circuitry is operative to determine, based on data supplied from the at least one load sensor, whether weight within a predefined range is applied to the first and second foot placement sections of the support platform housing.

14. The self-balancing transport vehicle of claim 1, wherein
at speeds of less than 1 meter per second, the net steering torque signal comprises the product of a constant coefficient of greater than or equal to 0.2 and the steering force input;
at speeds from 1 to 3 meters per second, the net steering torque signal comprises the product of a constant coefficient within a range of 0.1 to 1.0 inclusive, and the steering force input; and
at speeds greater than 3 meters per second, the net steering torque signal comprises a product of a constant coefficient less than or equal to 0.4, and the steering force input.

15. The self-balancing transport vehicle of claim 1, wherein the control circuitry is configured to receive a remote control signal via a remote control pathway, wherein the remote control signal indicates a desired direction of travel, and the control circuitry is operable to transmit a signal to adjust steering in the desired direction of travel.

* * * * *